US010561070B2

(12) United States Patent
Smith et al.

(10) Patent No.: US 10,561,070 B2
(45) Date of Patent: Feb. 18, 2020

(54) CURRENT SENSING OF ACTUATORS ON A ROUND BALER

(71) Applicant: CNH Industrial America LLC, New Holland, PA (US)

(72) Inventors: Kevin M. Smith, Narvon, PA (US); Mark K. Chow, Paoli, PA (US); Carl Brewer, Ephrata, PA (US); James D. Walker, Lititz, PA (US); Justin J. Snook, Loganton, PA (US); Larry L. Hoover, Landisville, PA (US)

(73) Assignee: CNH Industrial America LLC, New Holland, PA (US)

( * ) Notice: Subject to any disclaimer, the term of this patent is extended or adjusted under 35 U.S.C. 154(b) by 304 days.

(21) Appl. No.: 15/622,308

(22) Filed: Jun. 14, 2017

(65) Prior Publication Data

US 2017/0273247 A1 Sep. 28, 2017

Related U.S. Application Data

(62) Division of application No. 13/590,645, filed on Aug. 21, 2012, now Pat. No. 9,706,716.

(51) Int. Cl.
*G06F 7/00* (2006.01)
*A01F 15/07* (2006.01)

(52) U.S. Cl.
CPC .... *A01F 15/0715* (2013.01); *A01F 2015/076* (2013.01)

(58) Field of Classification Search
None
See application file for complete search history.

(56) References Cited

U.S. PATENT DOCUMENTS

| 4,514,955 A | 5/1985 | Mouser et al. |
| 4,602,560 A | 7/1986 | Jacky |
| 4,611,535 A | 9/1986 | Anstey et al. |
| 4,624,180 A | 11/1986 | Strosser |
| 4,656,931 A | 4/1987 | Van Den Bossche et al. |
| 4,674,403 A | 6/1987 | Bryant et al. |
| 5,152,123 A | 10/1992 | Viaud et al. |
| 5,231,828 A | 8/1993 | Swearingen et al. |
| 5,551,218 A | 9/1996 | Henderson et al. |
| 5,581,976 A | 12/1996 | Underhill |
| 5,615,544 A | 4/1997 | Berger et al. |

(Continued)

FOREIGN PATENT DOCUMENTS

DE 3640696 A1 6/1988

*Primary Examiner* — Yolanda R Cumbess
(74) *Attorney, Agent, or Firm* — Patrick M. Sheldrake; Peter K. Zacharias (57) ABSTRACT

Monitoring current draw of an actuator associated with a rotating arm on a round baler during a net wrapping cycle is used to determine the position of the rotating arm and actuator, as well as to determine the net tension. The current draw of the actuator may be correlated with the home and insert positions of the rotating arm during the net wrapping cycle; thus by monitoring the current draw, the rotating arm and actuator position is determined and may be provided to aid an operator. The net tension during the net wrapping cycle is a function of the rotating arm and actuator current. A calculation of net tension is determined and provided to an operator, allowing the operator to verify performance issues related to the net tension.

10 Claims, 8 Drawing Sheets

(56) References Cited

U.S. PATENT DOCUMENTS

| | | | |
|---|---|---|---|
| 5,687,548 A | | 11/1997 | McClure et al. |
| 5,802,825 A | | 9/1998 | Chow et al. |
| 6,006,504 A | * | 12/1999 | Myers ................ A01F 15/0715 53/556 |
| 6,012,271 A | | 1/2000 | Wilkens et al. |
| 6,035,773 A | * | 3/2000 | Rempe ................ A01F 15/141 100/13 |
| 6,209,450 B1 | | 4/2001 | Naaktgeboren et al. |
| 6,295,797 B1 | | 10/2001 | Naaktgeboren et al. |
| 6,446,548 B2 | | 9/2002 | Chow |
| 6,546,705 B2 | | 4/2003 | Scarlett et al. |
| 6,644,006 B1 | | 11/2003 | Merritt et al. |
| 6,675,561 B2 | | 1/2004 | Davis et al. |
| 6,688,092 B2 | | 2/2004 | Anstey et al. |
| 6,877,304 B1 | | 4/2005 | Smith et al. |
| 7,908,822 B2 | | 3/2011 | McClure |
| 7,918,072 B2 | | 4/2011 | McClure et al. |
| 8,011,295 B1 | | 9/2011 | Smith et al. |
| 2009/0202327 A1 | | 8/2009 | Cory et al. |
| 2014/0053510 A1 | | 2/2014 | Smith et al. |

\* cited by examiner

CURRENT SENSING OF ACTUATORS ON A ROUND BALER

CROSS REFERENCE TO RELATED APPLICATION

This application is a divisional of U.S. patent application Ser. No. 13/590,645, entitled "Current Sensing of Actuators on a Round Baler" and filed Aug. 21, 2012, the contents of which are incorporated herein by reference.

TECHNOLOGY FIELD

The present invention relates generally to sensing current of an actuator on a round baler, and more particularly to utilizing sensed current to determine actuator position and to adjust net tension during a net wrapping cycle.

BACKGROUND

For many years agricultural balers have been used to consolidate and package crop material so as to facilitate the storage and handling of the crop material for later use. Usually, a mower-conditioner cuts and conditions the crop material for windrow drying in the sun. When the cut crop material is properly dried, a baler, for example a round baler, travels along the windrows to pick up the crop material and form it into cylindrically-shaped round bales.

More specifically, pickups of the baler gather the cut and windrowed crop material from the ground, then convey the cut crop material into a bale-forming chamber within the baler. A drive mechanism operates to activate the pickups, augers, and a rotor of the feed mechanism. A conventional baling chamber may include a pair of opposing sidewalls with a series of belts that rotate and compress the crop material into a cylindrical shape.

When the bale has reached a desired size and density, a wrapping system may wrap the bale to ensure that the bale maintains its shape and density. For example, a net may be used to wrap the bale of crop material. A cutting or severing mechanism may be used to cut the net once the bale has been wrapped. The wrapped bale may be ejected from the baler and onto the ground by, for example, raising a tailgate of the baler. The tailgate is then closed and the cycle repeated as necessary and desired to manage the field of cut crop material.

To wrap the bale, the wrapping system executes a net wrapping cycle during which an actuator powers a rotating arm, also referred to as a duckbill, to move from a home position to an insert position to guide the net around the bale, and then to retract the duckbill from the insert position back to the home position once the bale is wrapped. During the net wrapping cycle, it would be desirable for an operator to know the position of the duckbill and actuator to be informed of the status of the net wrapping cycle. It would also be desirable for the operator to be informed of the tension of the net as net tension directly relates to the performance of the net wrapping system, and a variation of the net tension from a desired amount may indicate a performance issue with respect to the net wrapping system.

This document describes processes for determining the position of the rotating arm and actuator, as well as for determining the net tension, during a net wrapping cycle.

SUMMARY

Embodiments of the present invention are related to monitoring current draw of an actuator associated with a rotating arm on a round baler during a net wrapping cycle to determine the position of the rotating arm and actuator, as well as to determine the net tension.

In one embodiment, a method of determining a position of a motor on a baler during a net wrapping cycle of a bale on the baler comprises monitoring, by a controller coupled to the motor on the baler, current draw of the motor on the baler, wherein the motor controls operation of a rotating arm for the net wrapping cycle to move between a home position and an insert position; and correlating, by the controller, the monitored current draw of the motor with known positions of the motor during various points of the net wrapping cycle to determine the position of the motor.

In an embodiment, the known positions of the motor include one or more of: an initiation position at which the current draw increases from a current draw of zero to a predetermined peak current draw and decreases to a first predetermined current level; a home-to insert position at which the current draw nearly maintains the first predetermined current level; the insert position at which the current draw momentarily spikes from the first predetermined current level to the predetermined peak current draw; a retraction position at which the current draw exhibits a near steady increase; and the home position at which the current draw decreases to and stops at a current draw of zero.

According to embodiments, the initiation position may comprise the controller turning on the motor; the home-to-insert position may comprise the motor moving the rotating arm from a home position to an insert position; the insert position may comprise the controller terminating power to the motor when the rotating arm reaches the insert position; the retraction position may comprise the controller powering the motor to retract from the insert position to the home position; and the home position may comprise the controller terminating power to the motor when the rotating arm reaches the home position. According to an embodiment, retraction occurs after at least one of (i) a predetermined period of time has elapsed; and (ii) a predetermined amount of net has been placed on the bale.

Some embodiments may include providing, via a connection between the controller and a display, one or more of: (i) a representation of the monitored current draw of the motor to an operator; and (ii) an indication of one or more of the determined positions of the net wrapping cycle to an operator.

Additional embodiments may include determining an initial position of the motor at power-up of the controller via an on/off switch coupled to the controller; the controller receives an on signal indicating the motor is in the home position if the switch is on, and the controller receives an off signal indicating the motor is not in the home position if the switch is off.

In some embodiments, the motor may be powered to the home position by the controller at power-up of the controller; the controller monitors the current draw of the monitor, and determines that the motor is in the home position if the monitored current draw comprises a current spike and determines that the motor is not in the home position if the monitored current draw does not comprise a current spike.

Methods of the present invention may include, according to some embodiments, the controller determining if the net is starting to wrap the bale based on signals received from sensors configured to detect movement of the net and communicate with the controller. In some embodiments, upon a determination that the net is wrapping the bale, the controller may retract the rotating arm to the home position from the insert position. In other embodiments, upon a determination that the net is not wrapping the bale, the controller may determine whether the motor is stalled. If the motor is stalled, the controller turns off power to the motor and determines if the net is starting to wrap the bale based on the signals provided from the sensors; and if the motor is not stalled, the controller supplies the motor with a full pulse-width modulation (PWM) signal.

In some embodiments, the controller may supply a reduced duty cycle signal to the motor prior to the rotating arm reaching the insert position until occurrence of one of: (i) the net has started; (ii) a stall of the motor is detected; or (iii) a predetermined amount of time has elapsed.

Other aspects of the present invention are directed to a method of determining a tension of a net on a baler during a net wrapping cycle of a bale on the baler. The method includes monitoring, by a controller coupled to a motor on the baler, current draw of the motor on the baler, wherein the motor controls operation of a rotating arm for the net wrapping cycle to move between a home position and an insert position; and determining, by the controller, a net tension of the net on the baler based on a calculation from values of the monitored current during a time period the net is being applied to the bale.

According to an embodiment, the calculation from values of the monitored current during the time period the net is being applied to the bale comprises an average value of the monitored current.

In some embodiments, the net tension is represented as current of the rotating arm multiplied by a value K, where the value K is a function of torque and current of the motor.

According to an embodiment, the controller may determine if the determined net tension falls within an acceptable range. In some embodiments, via a connection between the controller and a display, an indication may be provided to an operator if the determined net tension does not fall within the acceptable range. In some embodiments, via a connection between the controller and an electric brake system connected to the motor, the net tension may be adjusted to fall within the acceptable range.

An additional embodiment provides a baler control system for a baler for use during a net wrapping cycle of a bale on the baler. The baler control system includes a controller coupled to a motor on the baler, where the motor is configured to control operation of a rotating arm for the net wrapping cycle to move between a home position and an insert position. The controller is configured to monitor current draw of the motor and correlate the monitored current draw of the motor with known positions of the motor during various points of the net wrapping cycle to determine the position of the motor. The baler control system also includes a display coupled to the controller configured to display one or more of: (i) a representation of the monitored current draw of the motor to an operator; and (ii) an indication of one or more of the determined positions of the net wrapping cycle to an operator.

In some embodiments, the controller of the baler control system is further configured to determine an initial position of the motor at power-up of the controller via an on/off switch coupled to the controller. The controller receives an on signal indicating the motor is in the home position if the switch is on, and the controller receives an off signal indicating the motor is not in the home position if the switch is off.

According to some embodiments, the controller is further configured to determine a tension of a net on the baler during the net wrapping cycle by determining a net tension of the net on the baler based on a calculation from values of the monitored current during a time period the net is being applied to the bale. The calculation from values of the monitored current during the time period the net is being applied to the bale comprises an average value of the monitored current.

BRIEF DESCRIPTION OF THE DRAWINGS

The foregoing and other aspects of the present invention are best understood from the following detailed description when read in connection with the accompanying drawings. For the purpose of illustrating the invention, there is shown in the drawings embodiments that are presently preferred, it being understood, however, that the invention is not limited to the specific instrumentalities disclosed. Included in the drawings are the following Figures.

DETAILED DESCRIPTION OF ILLUSTRATIVE EMBODIMENTS

Embodiments of the present invention relate to sensing current draw of an actuator or motor moving a rotating arm, also referred to herein as a duckbill, on a round baler. The current draw of the motor can be used to determine the motor position, which is a function of a stage or point of the net wrapping cycle. The current draw of the motor can also be used to determine net tension of the net wrapping system on the round baler. Being informed of the stage of the net wrapping cycle and the net tension are both desired pieces of information for an operator of the baler to assist the operator in the baling process, warn the operator of possible operational issues that may arise, assist the operator in completing an automatic wrap cycle, and assist the operator in executing adjustments to the tensioning system for optimal wrapper performance.

Embodiments of the present invention are particularly well suited for, but in no way limited to, use with agricultural balers, such as round balers, for example.

Agricultural balers, such as round balers, are well known in the agricultural industry, and the instant invention can be used with substantially any of such machines. Reference is made, for example, to U.S. Pat. Nos. 6,877,304; 6,688,092; 6,644,006; and 6,295,797 that illustrate such balers, the disclosures of which are incorporated herein by reference in their entirety. For illustrative purposes, details of an exemplary round baler in which the features of the present invention may be used are disclosed in and will be described here in part with reference to U.S. Pat. No. 5,581,976, which is also hereby incorporated by reference in its entirety.

Figure 1:
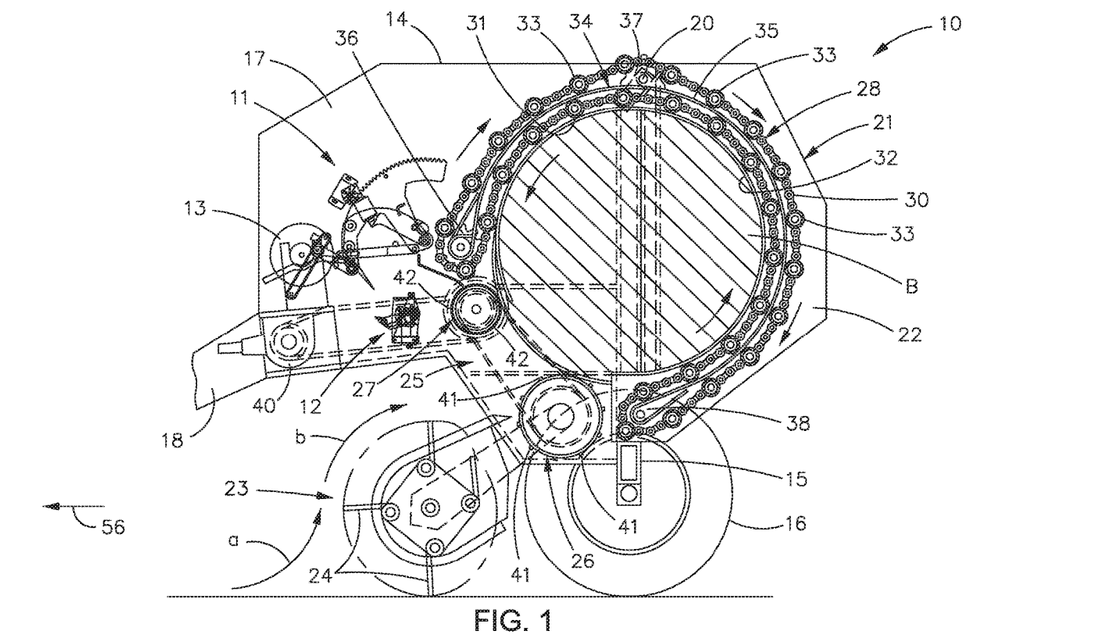
FIG. 1 is a cutaway side elevational view of an exemplary round baler in which the present invention may be employed.

FIG. 1 depicts an exemplary agricultural round baler, generally designated 10, in which embodiments of the present invention may be employed. As previously noted, crop in the field is usually arranged in a windrow as it is engaged by the baler 10 being pulled along the windrow of cut crop material by a tractor (not shown).

FIG. 1 shows a fixed chamber round baler 10 having a wrapping system for wrapping a cylindrical package of crop material (not shown) formed in a round baler 10. More particularly, the wrapping system of baler 10 comprises a net dispensing assembly 11 and a cutting assembly 12 for cutting web material, such as net, issued from a supply roll 13.

As shown, round baler 10 includes a main frame 14 with a main support beam 15 on which a pair of wheels 16 (only one shown) are rotatably affixed. The main frame includes a pair of side walls between which a cylindrical bale forming chamber extends. For the purposes of clarity only one wall 17 is shown in FIG. 1 and the elements mounted inwardly thereof are shown in full lines for clarity, which is an approach not uncommon in the descriptions in patents. For illustrative purposes reference letter B is used to designate a bale, shown in cross section in the chamber.

Baler 10 also includes a tongue 18 extending from the forward portion of main frame 14 for conventional connection to a tractor (not shown). Pivotally connected to the sidewalls of main frame 14 by a pair of stub shafts 20 is tailgate 21 which may be closed, as shown throughout the drawings, during bale formation or pivoted open about stub shafts 20 to discharge a completed bale. The tailgate includes tailgate walls 22 coextensive with side walls 17. A pickup assembly 23 mounted on main frame 14 in a suitable manner includes a plurality of fingers or tines 24 moveable in a predetermined path to lift crop material from the ground, generally depicted by direction arrow a, and deliver it rearwardly (arrow b) toward a transverse inlet 25 in the chamber defined by a floor roll 26 and a transverse stripper roll 27, both of which rolls are rotatably supported on mainframe 14 between sidewalls 17.

As shown, the bale forming chamber is defined primarily by an apron assembly 28 comprising a pair of support chains 30 mounted to travel along a continuous path, the inner run of which is defined on sidewalls 17 and tailgate walls 22 by front and rear sections 31, 32 of a continuous chain guide track that separates at a point of track adjacent the stub shaft 20 during bale discharge. The apron further comprises a plurality of parallel tubular crop engaging slats 33 extending between chains 30 to provide a cage-like periphery of the cylindrically shaped chamber. Radially outward of the inner run of apron assembly 28 are front and rear sections 34, 35 of continuous cylindrical bale chamber wall. These sections, also separable during bale discharge, are mounted between side walls 17 and tailgate walls 22, respectively, for maintaining integrity between the outer and inner runs of chain 30. Operatively engaged with chain 30 are drive sprocket 36 mounted between sidewalls 17, idler sprockets 37 also mounted between sidewalls 17 on shaft 20, and idler sprocket 38 mounted between tailgate walls 22. A conventional chain drive system for drive sprocket 36 is provided via appropriate coupling to gearbox 40 in a conventional manner, diagrammatically depicted in phantom outline outwardly of sidewall 17. The bale forming chamber is further defined by the outer conveying surfaces of floor roll 26 and stripper roll 27, both of which are driven in a direction opposite that of the bale chamber direction by conventional drive means appropriately coupled to gear box 40. In FIG. 1, floor roll 26 receives bale material at its forward surface, moving the bale material upward and rearward, clockwise as shown in FIG. 1. Bale material leaves the floor roll 26 and enters the bale chamber which rotates moving the bale material from a lower position, rearward and upward in a circular motion, counterclockwise as shown in FIG. 1. These rolls 26, 27 may be provided with ribs 41, 42 to enhance their ability to convey crops in the chamber as a bale is being formed. Other forms of aggressive surface structure may be used to accommodate various types of crops and conditions.

Figure 2:
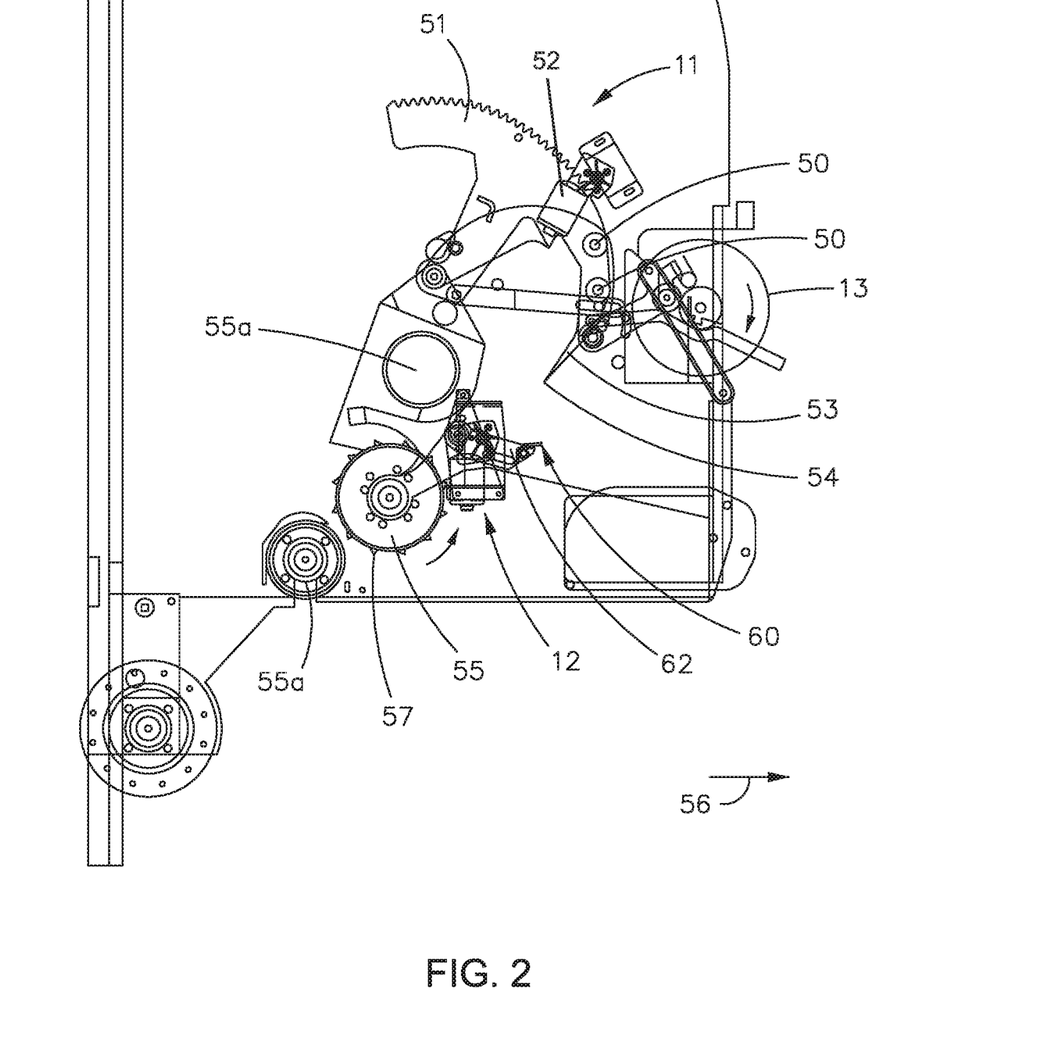
FIG. 2 shows a side view of an exemplary wrapper system in the home position.
Figure 3:
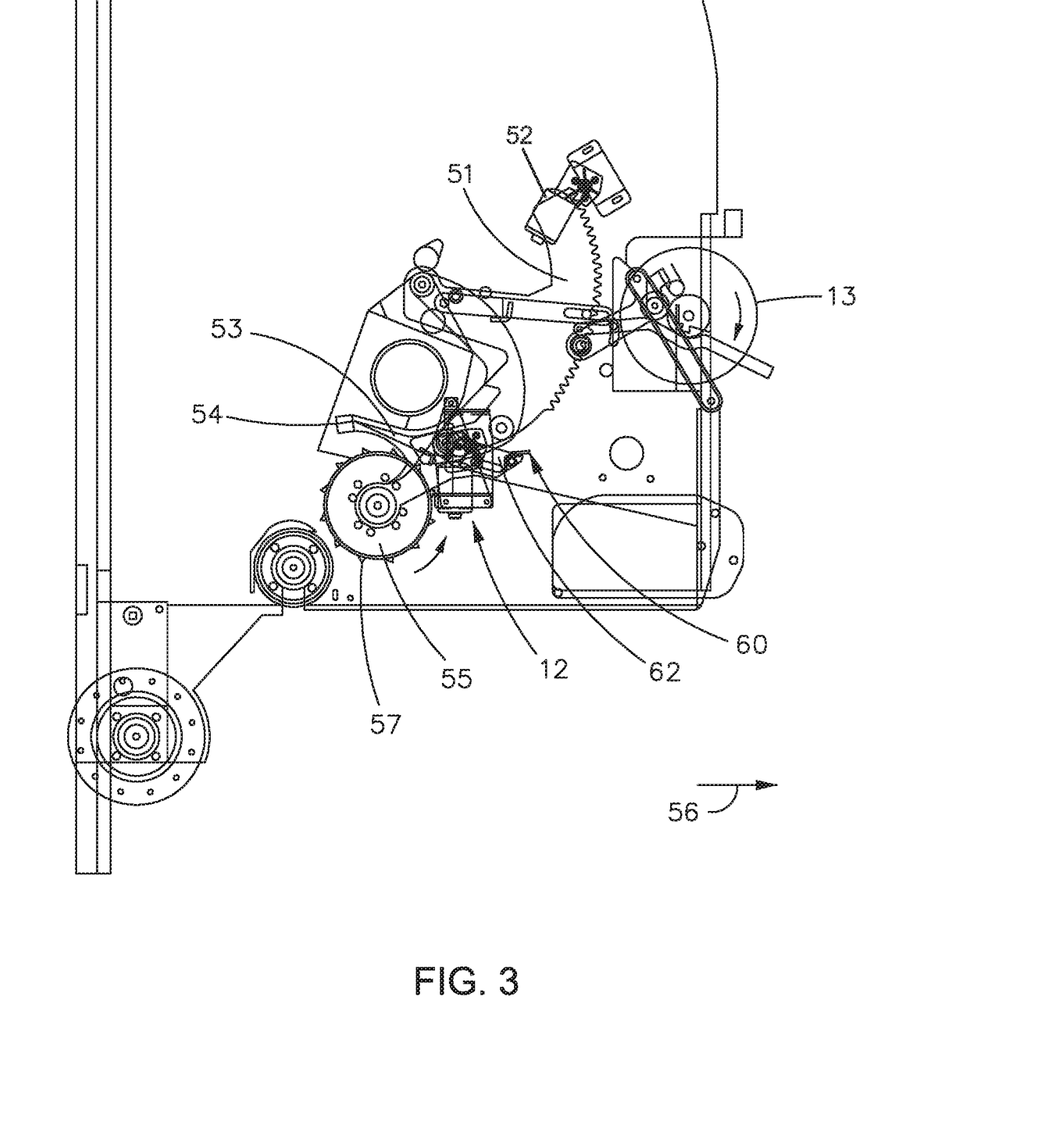
FIG. 3 shows a side cross-sectional view of an exemplary wrapper system with the duckbill in the insert position.
Figure 4:
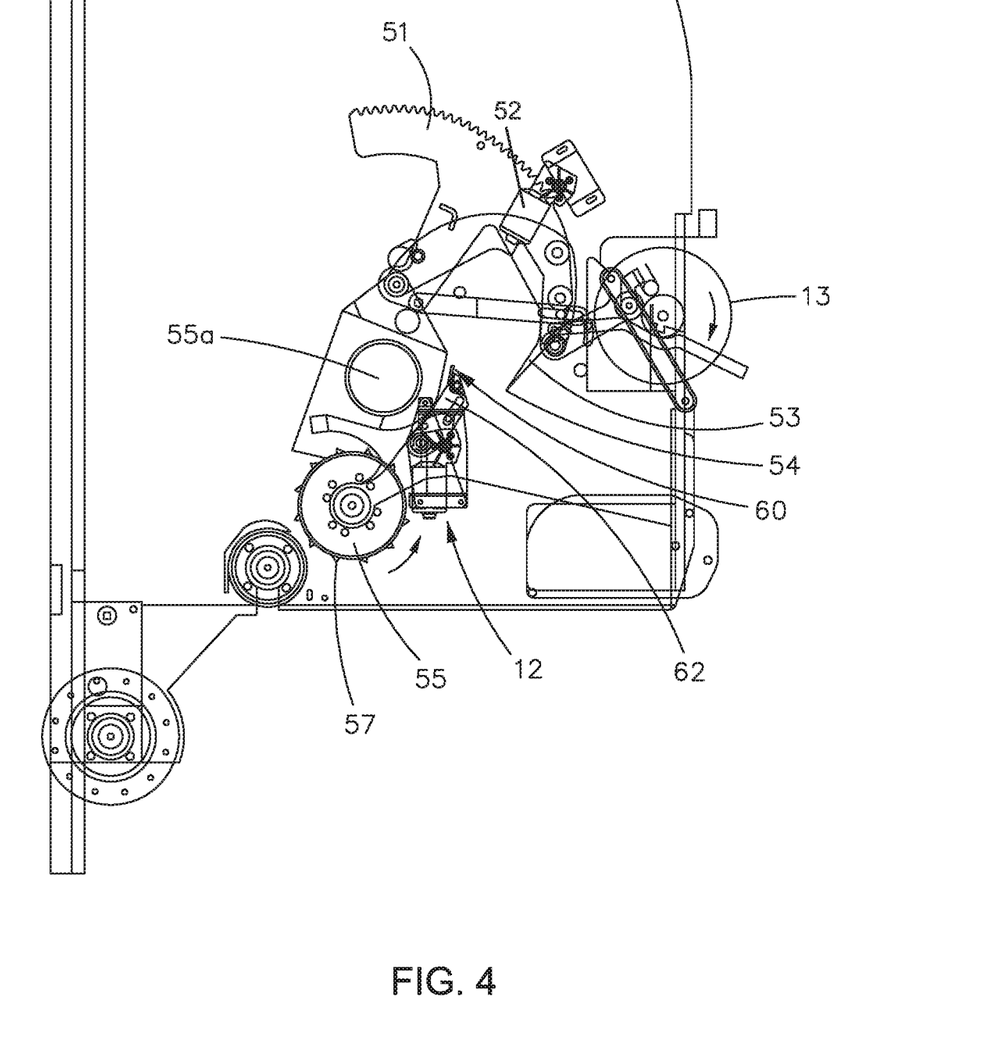
FIG. 4 shows a side view of an exemplary wrapper system in the home position with a knife assembly in the cut position.

FIGS. 2-4 show an exemplary embodiment of the bale wrapping system comprising net dispensing assembly 11 and net cutting assembly 12. As shown, the net dispensing assembly 11 includes a net roll 13, net spreader rolls 50, a duckbill assembly 51, a duckbill motor 52, and duckbill 53. Bale chamber rolls 55 facilitate the forming of the bale and wrapping of the bale with the net. (Reference numeral 55a is used to denote the location of the axis of a bale chamber roll, which is not shown, for clarity.) The net cutting assembly 12 may include a knife 60 and a knife arm 62.

The net dispensing assembly 11, including the duckbill 53 and its associated structure and mechanisms may be conventional and common to the structure and operation described in the baler patents referenced and incorporated herein by reference above.

As shown, the net may be fed from the net roll 13 and travel over the net spreader rolls 50 and exit a tip 54 of the duckbill 53. The tip 54 of the duckbill 53 serves to pinch the net and prevent the net from snapping back through the duckbill 53 once it is cut. Typically, a portion of net will extend out of the tip after a net cutting action. For example, it is common for a section of net that hangs out of the tip of the duckbill and that net tail is where it grabs on to the bale when the duckbill is inserted for the next net wrapping cycle.

As shown, the duckbill motor 52 may be dedicated to the duckbill 53, and operation of the duckbill motor 52 functions to insert the duckbill 53 to commence a net wrapping cycle and then to retract the duckbill 53 at the end of the wrapping cycle once the net has been cut. The net spreader rolls 50 function to define the path of the net as it weaves through the duckbill assembly and to ensure the net is stretched to one side of the bale to the other side of the bale. In the operation of the illustrated net dispensing assembly 11, the net comes off the bottom of the net roll 13, which, in the figure, rotates clockwise, and goes around the upper side of the upper net spreader roll 50 and then makes essentially an 180-degree turn and then goes on the net roll side of the lower net spreader roll 50 and then through the tip 54 of the duck bill 53. The rotational direction of the net roll 13 is unimportant, but ultimately determines the location where the net leaves the roll, and/or the number and placement of additional rolls needed to direct the net appropriately to the duck bill, and eventually rearward, toward the bale chamber. The front of the baler is indicated by arrow 56.

The bale chamber roll 55 closest to the up-cut net knife assembly 12 may include ribs 57 disposed about the outside of the roll. A bale chamber roller 55 positioned above this roller (not shown) may also include ribs. A gap or clearance may be formed between these two bale chamber rollers 55 to allow access for the tip 54 of the duckbill 53. As the bale chamber roll 55 rotates, the net pinches between the rolls and the bale and ribs 57 help grabs the net and feed it into the bale chamber and onto the bale. In the illustrated embodiment, the bale may rotate such that the top material moves forward and downward, with respect to the baler, clockwise as shown in the figure, in the chamber and the bale chamber rolls 55 rotate in the opposite direction, here counterclockwise.

FIG. 2 shows the net dispensing assembly 11 and the knife assembly 12 in the home position. FIG. 3 shows the duckbill 53 in the insert position. FIG. 4 shows the net dispensing assembly 11 again in the home position with the knife assembly 12 in the cut position.

During a net wrapping cycle, the net dispensing assembly 11 moves through two positions: the home position to the insert position and back to the home position. In the home position (FIG. 2), the duckbill 53 of the net dispensing assembly 11 is in the raised or home position. The home position is typically employed at the time a bale is being formed. At some point in time, the bale forming operation is completed and the time to wrap the bale occurs. At this time, the duckbill 53 of the net dispensing assembly 11 is lowered to the insert position (FIG. 3), where the duckbill 53 rotates into the bale chamber. The duckbill tip 54 fits in between upper and lower bale chamber rolls 55 (the upper roll is not shown for clarity, but its location is marked 55*a*), and the net is pinched between the bale and the lower roll causing the net to start to feed on to the bale. Sensors (not shown) may be provided to determine when the net is flowing on to the bale. Once it is determined that the net has started wrapping on the bale, the duckbill 53 is retracted out of the bale chamber and returns to the duckbill home position (FIG. 4). Completion of the net wrapping may be determined using sensors and/or via passage of a specified time period. At this point in the net wrapping cycle, the net is still flowing out of the duckbill 53 to the bale chamber. It is also time to cut the net, the operation of which is performed by the knife assembly 12.

Figure 5:
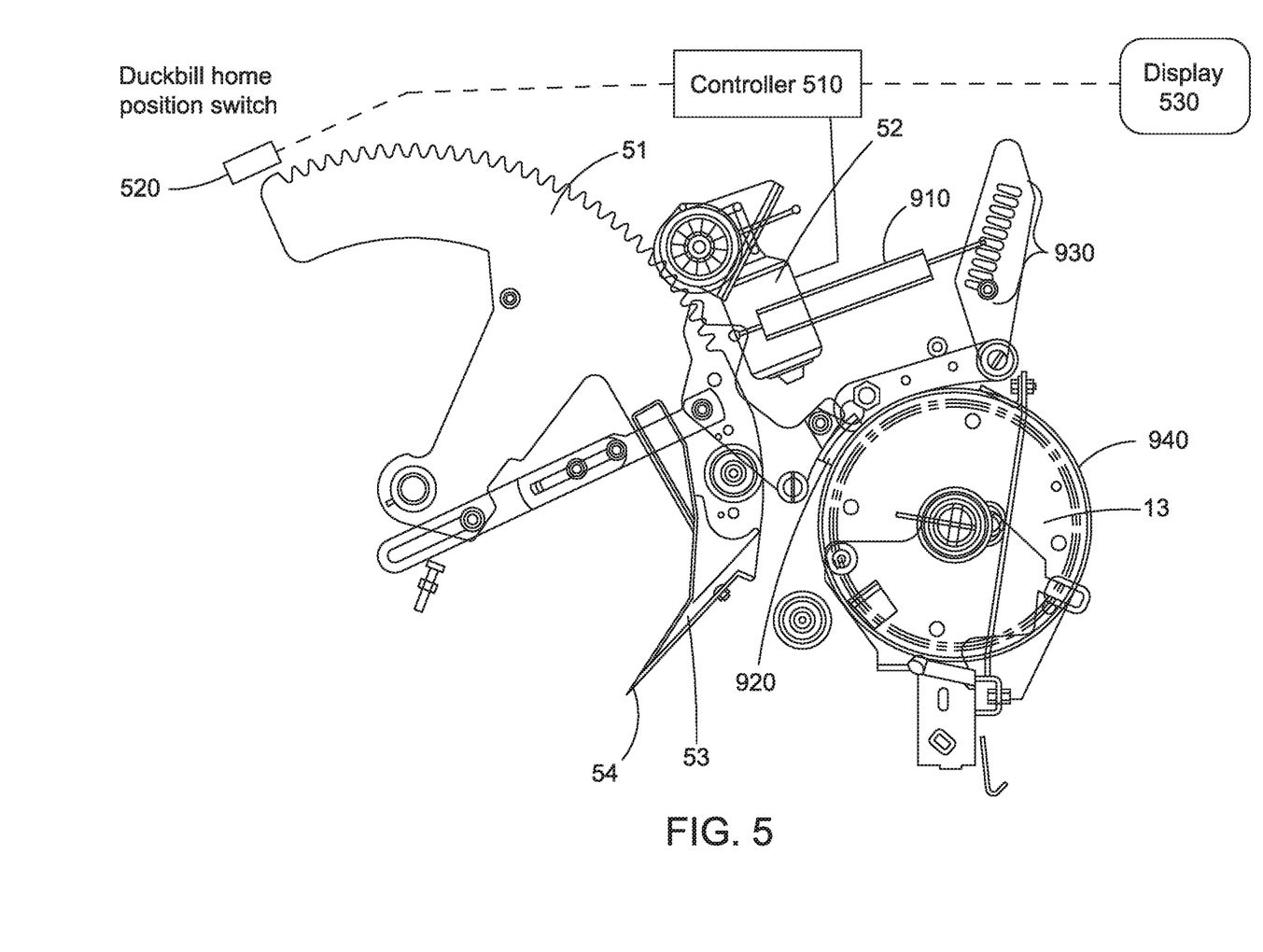
FIG. 5 shows a side view of an exemplary wrapper system in the home position with an exemplary controller.

FIG. 5 shows the net dispensing assembly 11 in the home position, and further includes a controller 510, a duckbill home position switch 520, and a display 530.

The net wrapping cycle may be correlated with a current draw of the duckbill motor 52, which functions to control movement of the duckbill 53 during a net wrapping cycle. According to an embodiment, current draw on the duckbill motor 52 is measured by the controller 510, which is coupled to the duckbill motor 52, and this current measurement is used to determine the position of the duckbill motor 52 during a net wrapping cycle and the various stages of the net wrapping cycle. By determining the position of the duckbill motor 52, an operator of the baler, such as the round baler 10 shown in FIG. 1, may be informed of and able to monitor the status of a net wrapping cycle. The operator may be provided with the relevant information (i.e., current measurement and/or position of the duckbill motor 52 and/or stage of the net wrapping cycle) via the display 530, which is connected to the controller 510 for receiving and displaying data.

For example, during the net wrapping cycle the following sequence occurs: (1) initiation: the controller 510 powers the duckbill motor 52 to move from the home position to the insert position to insert the duckbill 53; (2) home-to-insert: the duckbill 53 moves to the insert position and stops, causing the duckbill motor 52 to stall; (3) insert: the controller 510 determines the duckbill motor 52 has stalled when the current draw exceeds a predetermined value; (4) the controller 510 terminates power to the duckbill motor 52; (5) retraction: after a predetermined period of time or after a predetermined amount of net has been placed on the bale, the controller 510 powers the duckbill motor 52 to retract the duckbill 53 to the home position; (6) home: the duckbill 53 reaches the home position and stops, causing the duckbill motor 52 to stall; (7) the controller 510 determines the duckbill motor 52 has stalled when the current draw exceeds a predetermined value; and (8) the controller 510 terminates power to the duckbill motor 52.

Figure 6:
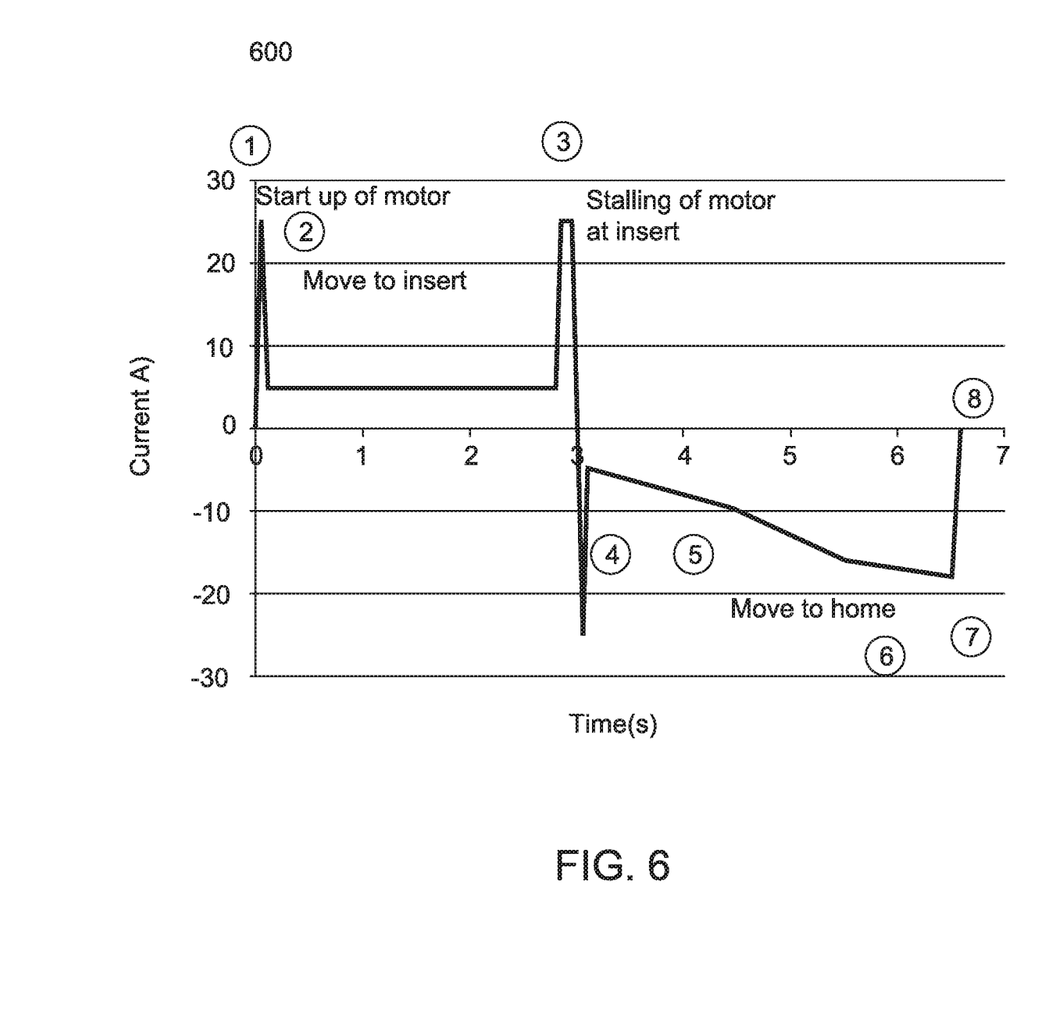
FIG. 6 is a graphical representation of an exemplary time-current plot of a duckbill motor.

FIG. 6 provides a graphical representation 600 of an exemplary time-current plot of the duckbill motor 52. The graphical representation 600 illustrates how the current of the duckbill motor 52 changes during the net wrapping cycle. The numbered sequence described above is provided on the graphical representation 600. By monitoring current draw of the duckbill motor 52 during a net wrapping cycle, the controller 510 correlates the monitored current draw with the known positions of the duckbill motor 52 during the net wrapping cycle to determine the position of the duckbill motor 52. For example, if the controller 510 obtains a current measurement in which the current draw increases from a current draw of zero to a predetermined peak current draw and decreases to a first predetermined current level, such measurement correlates to the initiation position of the duckbill motor 52 (i.e., the controller 510 is turning on the duckbill motor 52). In this manner, the controller 510 may determine the positions of the duckbill motor 52 throughout the net wrapping cycle.

Other monitored current measurements may be correlated with the known positions of the duckbill motor 52 by the controller 510 as follows: a current measurement in which the current draw nearly maintains the first predetermined current level correlates to the home-to-insert position (i.e., the motor 52 moving the duckbill 53 from a home position to an insert position); a current measurement in which the current draw momentarily spikes from the first predetermined current level to the predetermined peak current draw correlates to the insert position (i.e., the controller 510 terminating power to the motor 52 when the duckbill 53 reaches the insert position); a current measurement in which the current draw exhibits a near steady increase correlates to the retraction position (i.e., the controller 510 powering the motor 52 to retract from the insert position to the home position); and a current measurement in which the current draw decreases to and stops at a current draw of zero correlates to the home position (i.e., the controller 510 terminating power to the motor 52 when the duckbill 53 reaches the home position).

According to an additional embodiment, the duckbill home position switch 520 may be used to determine the position of the duckbill motor 52 at power-up of the controller 510. The position of the duckbill motor 52 at power-up may be desired information for the operator, for example, so that the operator is informed if a net wrapping cycle may be commenced. The duckbill home position switch 520 may be an on/off switch that is coupled to and communicates with the controller 510. When power is applied to the controller 510, the controller 510 receives a signal indicating if the duckbill motor 52 is in the home position. In another embodiment, at power-up of the controller 510, the duckbill motor 52 may be powered to the home position. If a current spike is detected, via the controller 510 monitoring the current of the duckbill motor 52, then the duckbill motor 52 is determined to be in the home position. If no current spike is detected through the current monitoring by the controller 510, then the duckbill motor 52 is determined to not be in the home position. If the duckbill motor 52 is not in the home position, a warning may be sent to the operator via, for example, the controller 510 sending a signal to be displayed on the display 530.

Figure 7:
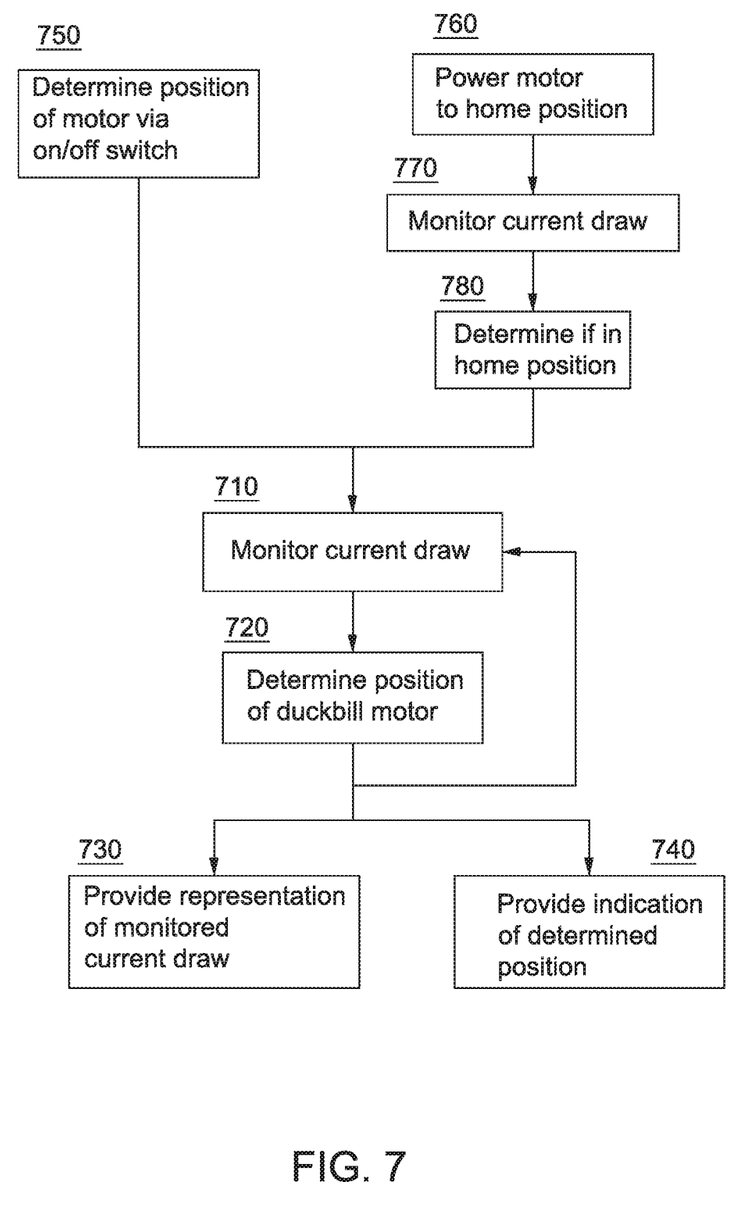
FIG. 7 illustrates a flowchart of an exemplary method of utilizing current draw of a duckbill motor to determine positions of the duckbill motor.

The flow chart of FIG. 7 illustrates a method of utilizing the current draw of the duckbill motor 52 to determine a position of the duckbill motor 52 during a net wrapping cycle of a bale on the baler 10. At 710, the controller 510 monitors current draw of the motor 52.

At 720, the controller 510 correlates the monitored current draw of the motor 52 with known positions of the motor 52 during the various points of the net wrapping cycle to determine the position of the motor 52. The various positions include, as described above: initiation, when the duckbill motor 52 is powered to move from the home position to the insert position to insert the duckbill 53; home-to-insert, when the duckbill 53 moves to the insert position and stops; insert, when the duckbill motor 52 has stalled; retraction, when the duckbill motor 52 is powered to retract the duckbill 53 to the home position; and home, when the duckbill 53 reaches the home position. This determination operation may be continuously performed and repeated throughout the course of a net wrapping cycle and may be initiated for each new net wrapping cycle.

At 730, a representation of the monitored current draw of the duckbill motor 52 may be provided to an operator via the connection between the controller 510 and the display 520. The representation may be in the form of a graph (such as that provided in FIG. 6), a current value, or a combination thereof. The representation may be continuously provided so that the operator may be continuously informed of the status of the net wrapping cycle. Alternately, the representation may be provided at pre-established times during the net wrapping cycle.

At 740, an indication of the determined position of the motor 52 may be provided to an operator via the connection between the controller 510 and the display 520. This indication may be continuously displayed and provided via the display 520, so that at each stage throughout the net wrapping cycle, the operator is aware of the determined positions of the duckbill motor 52. The determined position may, for example, be provided in an area overlaying the graph of FIG. 6. The determined position, similar to the representation of the monitored current draw, may be provided at pre-established times during the net wrapping cycle.

Prior to the net wrapping cycle, when the controller 510 is powered-up, there may be a need to determine the position of the duckbill motor 52. Thus, at 750, prior to the monitoring of the current draw of the duckbill motor 52 at 710, the duckbill home position switch 520 may be used to determine the position of the duckbill motor 52. The controller 510 may, according to this embodiment, receive an on signal indicating the motor 52 is in the home position if the duckbill home position switch 520 is on, and the controller 510 may receive an off signal indicating the motor 52 is not in the home position if the duckbill home position switch 520 is off. If the duckbill motor 52 is found to not be in the home position, then a signal may be sent to the operator via the controller 510 to the display 530.

According to another embodiment, and again prior to the net wrapping cycle, when the controller 510 is powered-up, at 760, prior to the monitoring of the current draw of the duckbill motor 52 at 710, the controller 510 may power the duckbill motor 52 to the home position. At 770, the controller 510 monitors the current draw of the duckbill motor 52, and at 780 determines that the motor 52 is in a home position if the monitored current draw comprises a current spike or that the motor 52 is not in the home position if the monitored current draw does not comprise a current spike. If the duckbill motor 52 is found to not be in the home position, then a signal may be sent to the operator via the controller 510 to the display 530.

According to other aspects of the present invention, the current draw on the duckbill motor 52 may be used to determine net tension of the net wrapping system on the round baler 10. Being informed of the net tension is desirable for an operator to determine if adjustments are necessary as the net tension affects the performance of the net wrapping system of the baler 10.

During operation of the net wrapping cycle, the duckbill 53 returns to a home position after the net has started to wrap the bale. The tension of the net provides resistance that acts to prevent the duckbill 53 from returning to the home position; thus the movement to the home position requires the duckbill motor 52 to overcome the net tension forces. The net tension may be represented as a function of the current of the duckbill 53 and a value K that is based on the torque and current of the duckbill motor 52. According to an embodiment, the following representation applies: Net tension=current of duckbill×K. The controller 510 continuously monitors the current of the motor 52 and determines a value for net tension, which is provided to the operator via the display 530.

Figure 8:
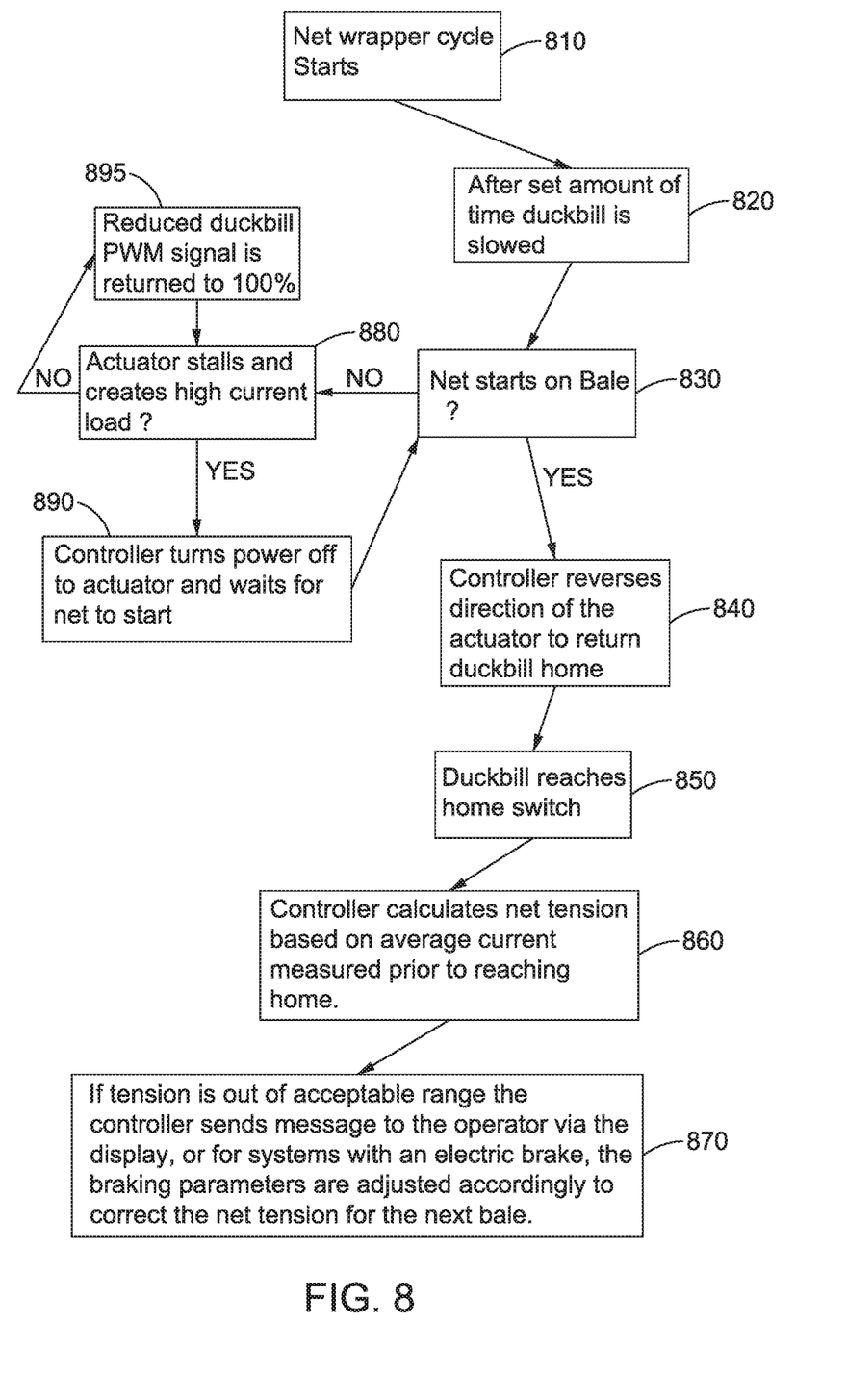
FIG. 8 illustrates a flowchart of an exemplary method of utilizing current draw of a duckbill motor to determine a net tension of a net as the net moves to the home position.

The flow chart of FIG. 8 illustrates a method of utilizing the current draw of the duckbill motor 52 to determine a net tension of the net as the net moves to the home position.

At 810, the method begins with starting the net wrapper cycle. At 820, after a predetermined amount of time, the speed of the duckbill 53 is slowed by the controller 510 adjusting the speed at which the duckbill motor 52 moves the duckbill 53.

At 830, the controller 510 makes a determination as to whether the net is starting to wrap the bale. This determination may be made by, for example, sensors communicating with the controller 510 to relay information related to the net wrapping of the bale.

At 840, if the net has started to wrap the bale, the controller 510 reverses direction of the motor 52 to return the duckbill 53 to a home position, and at 850 the duckbill 53 reaches the home position.

At 860, the controller 510 then calculates the net tension based on a calculation from values of the monitored current during a time period that the net is being applied to the bale. For example, the calculation may be the average current measured prior to the duckbill 53 reaching the home position. More particularly, this calculation may be based on the average current one second prior to reaching the home position, for example. The equation Net tension=current of duckbill×K, as described above, may be used for the calculation by the controller 510.

At 870, if the net tension is out of an acceptable range, the controller 510 sends a message to the operator via the display 530.

In an embodiment, rather than or in addition to sending a message to be displayed to an operator, an electric brake system may be utilized to accordingly adjust braking parameters to correct the net tension. Referring again to FIG. 5, the net wrapping system includes components of an electric brake system. The electric brake system includes a brake spring 910, a brake pad 920, brake spring adjustment holes 930, and a brake drum 940. The controller 510 controls the electric brake system to apply a braking force for controlling the operation of wrapping the bale with the net. U.S. Pat. No. 7,908,822, the disclosure of which is incorporated herein by reference in its entirety, provides a description of the configuration and operation of the electric brake system that may be employed herein.

Returning to FIG. 8, at 880, if the determination as to whether the net started on the bale is "no" at 830, then a determination is made as to whether the motor 52 stalled and created a high current load. If yes, at 890, the controller 510 turns off the power to the motor 52 and waits for the net to be started on the bale (830). If the motor 52 did not stall and create a high current load, then at 895, the pulse-width modulation (PWM) signal of the duckbill motor 52 is returned to 100%.

An embodiment provides for changing the speed of the duckbill 53 during the net wrapping cycle to improve the initial flow of the net. When the duckbill 53 is approaching the insert position, the controller 510 supplies the duckbill motor 52 with a reduced duty cycle PWM signal. This reduced signal is supplied to the motor 52 until one of the following occurs: the net has started, a stall has been detected due to a high current reading of the motor 52, or a predetermined amount of time has elapsed. If the predetermined amount of time has elapsed without the net starting and with a low current reading, a 100% duty cycle signal is supplied to the motor 52 from the controller 510 to ensure the motor 52 has reached the fully inserted position. An additional benefit of slowing the motor 52 as the duckbill 53 approaches the insert position is an improved reaction time of the motor 52 to move the duckbill 53 in the opposite direction for retraction after the net wrapping cycle.

The controller 510 may be a processing device, computing device, processor, or the like for performing calculations and operations described herein. The controller 510 interfaces with the duckbill home position switch 520 and the display 530, and may also interface with one or more memory devices (not shown) such as read only memory (ROM), random access memory (RAM), and one or more optional non-transitory memory devices such as, for example, an external or internal DVD drive, a CD ROM drive, a hard drive, flash memory, a USB drive, or the like. The memory devices may be configured to include individual files and/or one or more databases for storing any software modules, instructions, or data.

Program instructions, software, or interactive modules for performing any of the functional steps associated with the processes as described above may be stored in the ROM and/or the RAM. Optionally, the program instructions may be stored on a tangible computer readable medium such as a compact disk, a digital disk, flash memory, a memory card, a USB drive, an optical disc storage medium, such as a Blu-ray™ disc, and/or other recording medium.

An optional display interface may permit information from the controller 510 to be displayed on the display 530 in audio, visual, graphic, and/or alphanumeric format. For example, the display 530 may be positioned in a cab utilized by the operator of the baling process so that the operator may safely and conveniently see the information during operation. Communication with external devices may occur using various communication ports that may be attached to one or more communications networks, such as the Internet or a local area network, or directly to a portable computing device such as a notebook computer. An interface may allow for receipt of data from input devices such as a keyboard, a mouse, a joystick, a touch screen, a remote control, a pointing device, a video input device, an audio input device, and the like accessible by the operator.

Although the present invention has been described with reference to exemplary embodiments, it is not limited thereto. Those skilled in the art will appreciate that numerous changes and modifications may be made to the preferred embodiments of the invention and that such changes and modifications may be made without departing from the true spirit of the invention. It is therefore intended that the appended claims be construed to cover all such equivalent variations as fall within the true spirit and scope of the invention.

We claim:

1. A method of determining a tension of a net on a baler during a net wrapping cycle of a bale on the baler, the method comprising:
    monitoring, by a controller coupled to a motor on the baler, current draw of the motor on the baler, wherein the motor controls operation of a rotating arm for the net wrapping cycle to move between a home position and an insert position; and
    determining, by the controller, a net tension of the net on the baler based on a calculation from values of the monitored current during a time period the net is being applied to the bale.

2. The method of claim 1, wherein the calculation from values of the monitored current during the time period the net is being applied to the bale comprises an average value of the monitored current.

3. A method of determining a tension of a net on a baler during a net wrapping cycle of a bale on the baler, the method comprising:
    monitoring, by a controller coupled to a motor on the baler, current draw of the motor on the baler, wherein the motor controls operation of a rotating arm for the net wrapping cycle to move between a home position and an insert position;
    determining, by the controller, a net tension of the net on the baler based on a calculation from values of the monitored current during a time period the net is being applied to the bale; and
    wherein the net tension is represented as current of the rotating arm multiplied by a value K, wherein the value K is a function of torque and current of the motor.

4. A method of determining a tension of a net on a baler during a net wrapping cycle of a bale on the baler, the method comprising:
    monitoring, by a controller coupled to a motor on the baler, current draw of the motor on the baler, wherein the motor controls operation of a rotating arm for the net wrapping cycle to move between a home position and an insert position;
    determining, by the controller, a net tension of the net on the baler based on a calculation from values of the monitored current during a time period the net is being applied to the bale; and
    determining by the controller if the determined net tension falls within an acceptable range.

5. The method of claim 4, further comprising providing, via a connection between the controller and a display, an indication to an operator if the determined net tension does not fall within the acceptable range.

6. The method of claim 4, further comprising adjusting, via a connection between the controller and an electric brake system connected to the motor, the net tension to fall within the acceptable range.

7. A baler control system for a baler for use during a net wrapping cycle of a bale on the baler, comprising
    a controller coupled to a motor on the baler, the motor configured to control operation of a rotating arm for the net wrapping cycle to move between a home position and an insert position, the controller configured to monitor current draw of the motor and
    wherein the controller is further configured to determine a tension of a net on the baler during the net wrapping cycle by determining a net tension of the net on the baler based on a calculation from values of the monitored current during a time period the net is being applied to the bale.

8. The baler control system of claim 7, wherein the controller is further configured to determine an initial position of the motor at power-up of the controller via an on/off switch coupled to the controller;
   wherein the controller receives an on signal indicating the motor is in the home position if the switch is on, and wherein the controller receives an off signal indicating the motor is not in the home position if the switch is off.

9. The baler control system of claim 7, wherein the calculation from values of the monitored current during the time period the net is being applied to the bale comprises an average value of the monitored current.

10. A baler control system for a baler for use during a net wrapping cycle of a bale on the baler, comprising:

a controller coupled to a motor, the motor configured to control operation of a rotating arm for the net wrapping cycle to move between a home position and an insert position, the controller configured to monitor current draw of the motor;

wherein the controller is further configured to determine a tension of a net on the baler during the net wrapping cycle by determining a net tension of the net on the baler based on a calculation from values of the monitored current during a time period the net is being applied to the bale; and a display coupled to the controller configured to display one or more of: (i) a representation of the monitored current draw of the motor to an operator; and (ii) an indication of one or more of the determined positions of the net wrapping cycle to an operator.

\* \* \* \* \*